C. S. ROBB.
APPARATUS FOR DRAWING GLASS CYLINDERS.
APPLICATION FILED JAN. 16, 1917.
1,256,260.
Patented Feb. 12, 1918.
2 SHEETS—SHEET 2.
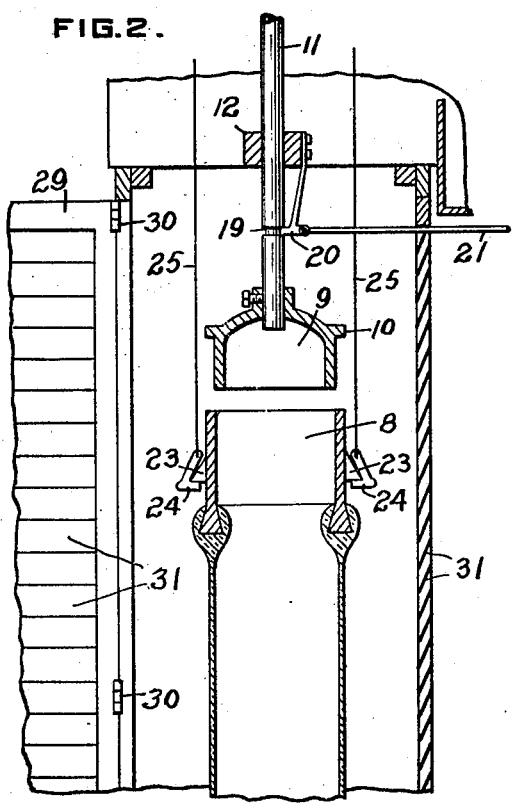
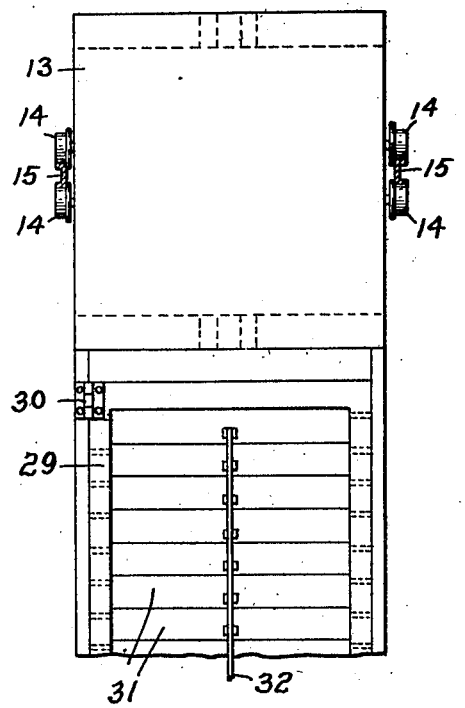
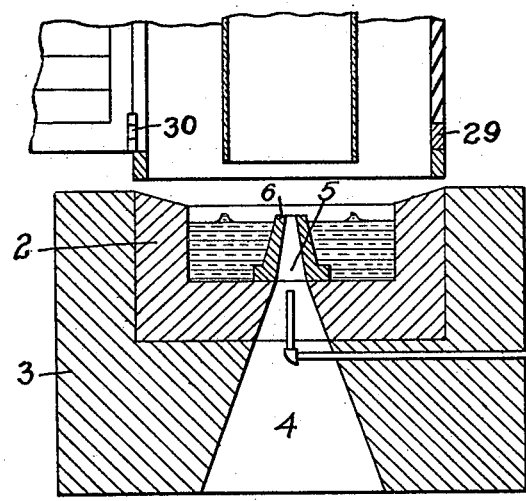
WITNESSES
INVENTOR

UNITED STATES PATENT OFFICE.

CLYDE S. ROBB, OF WASHINGTON, PENNSYLVANIA, ASSIGNOR OF ONE-HALF TO CHARLES J. KUNZLER, OF PITTSBURGH, PENNSYLVANIA.

APPARATUS FOR DRAWING GLASS CYLINDERS.

1,256,260.  Specification of Letters Patent.  Patented Feb. 12, 1918.

Application filed January 16, 1917. Serial No. 142,622.

*To all whom it may concern:*

Be it known that I, CLYDE S. ROBB, a citizen of the United States, residing at 835 Jefferson Ave., Washington, in the county of Washington and State of Pennsylvania, have invented certain new and useful Improvements in Apparatus for Drawing Glass Cylinders, of which the following is a specification.

My invention consists in an improvement in apparatus for drawing glass blanks in the manufacture of window glass.

It has for its object to provide means for portably supporting the entire drawing mechanism including the bait, means for raising and lowering the bait and for detachably connecting it with a centralizing guiding rod, also a protecting shield of novel construction, and a super-imposed trolley cage providing for manipulation of the several necessary elements in carrying out their functions by an operator stationed therein.

The invention also embodies certain additional features as to the pot construction as hereinafter described.

The invention has in view to provide means for raising and lowering the bait with relation to the pot, supporting the cylinder-in-process during its formation and providing for easy and quick detachment of the drawn cylinder and the attached bait for removal.

One preferred embodiment of the invention is illustrated in the accompanying drawings, in which, Figure 1 is a general view in sectional elevation showing the apparatus in operative position with relation to the drawing pot.

Fig. 2 is a vertical sectional view similar to Fig. 1, showing the relative position of the parts after completion of the cylinder and its severance from the bath at the base and also illustrating a portion of the hinged partition in opened position, the traveling cage and its parts being omitted.

Fig. 3 is a partial view in sectional elevation indicated by the line III. III of Fig. 1.

Fig. 4 is a cross-sectional view on the line IV, IV of Fig. 1.

Figure 1:
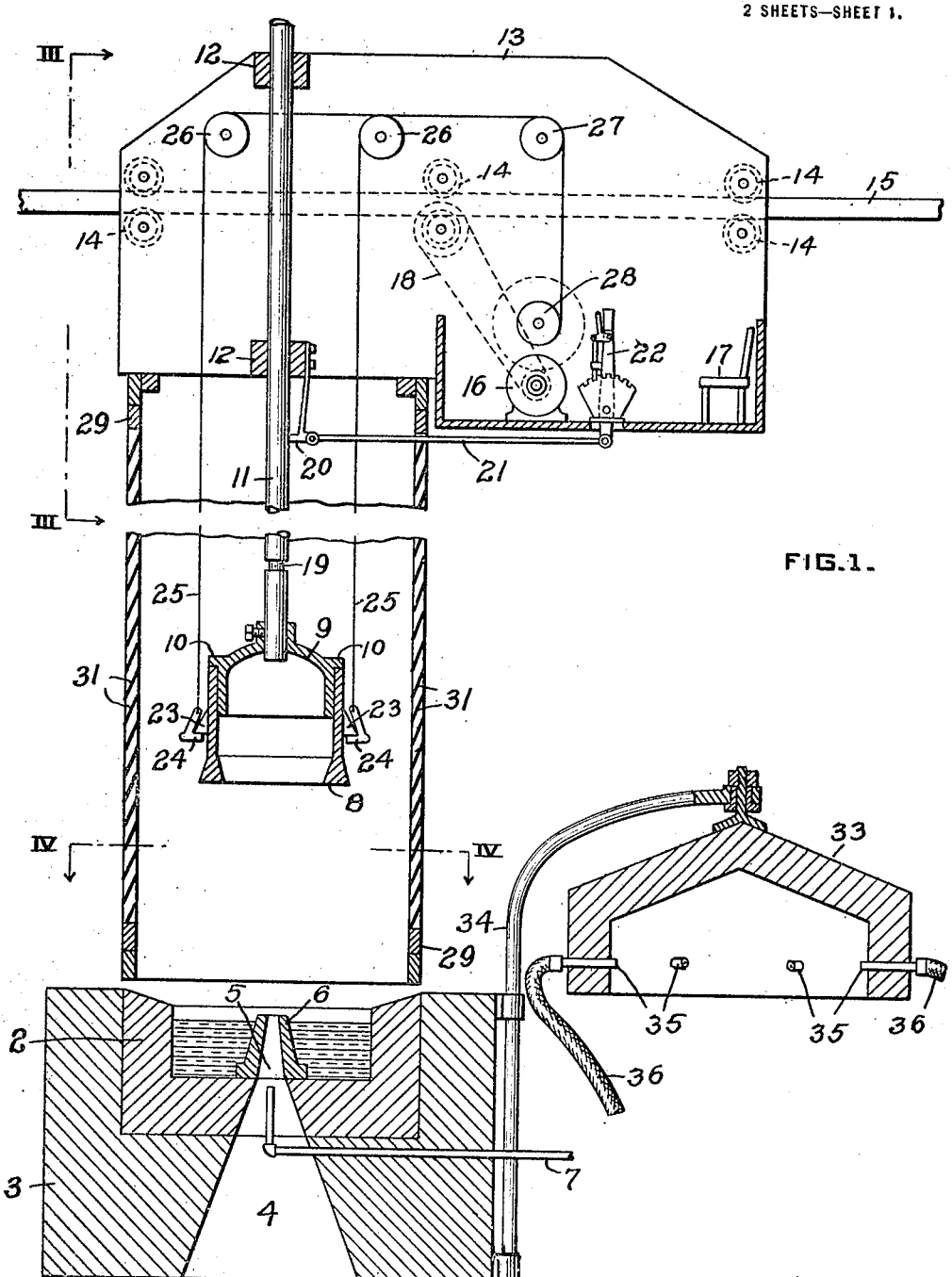

The pot 2 may be of any usual or preferred construction, and is mounted upon a foundation construction 3 provided with a centrally arranged lower well 4 communicating upwardly through the center of the pot by an opening 5 therein. A hollow block or nozzle 6 is normally located over and around said opening, whereby to project upwardly through and beyond the molten glass for the purpose of supplying air to the interior of the cylinder, as furnished by a pipe 7 or other suitable means. The well 4 is also provided for the purpose of collecting any surplus or waste glass which may be drawn downwardly thereinto upon removal of the nozzle 6.

The bait 8, which is adapted to be lowered upon and into the molten glass and raised therefrom in the formation of the cylinder, which process is well understood by those skilled in the art, is detachably connected with a base 9, with which it is in telescoping engagement as shown, the base having an annular flange 10 abutting against the upper edge of the bait, or otherwise mounted so as to provide a positive abutting engagement between these parts.

Base 9 is fixedly connected with a vertically movable centrally arranged guide bar or rod 11. Said rod extends upwardly through guiding bearings 12, 12, in the lower and upper portions respectively, of a trolley cage or framework 13.

Said cage is mounted by the usual wheels 14 at each side upon a supporting trackway 15 of ordinary construction, whereby the cage may be traveled backwardly and forwardly along the trackway under the controlled power of a suitable motor 16, and is regulated by the operator who may be located at any convenient position, as upon the seat 17.

One or more of the supporting wheels of the cage or buggy may be geared with said motor, as by sprocket, indicated at 18, or other suitable means may be utilized for propelling the buggy in either direction and for locating it with the center of rod 11 exactly over the center of the glass pot.

Rod 11 is provided adjacent the bait and its base with an annular notch 19 adapted, when the bait is raised, to be engaged by the spring-actuated locking trigger 20 and to be held thereby in suspended position at its uppermost point of travel.

Trigger 20 normally bears inwardly against the face of the rod 11 and is retracted to release the rod by connection 21 and lever 22, by the operator. As thus mounted, it is designed to automatically engage the shouldered recess 19 when in register.

Bait 8 is provided with laterally extending lugs or hooks 23 at opposite sides, adapted to be engaged by supporting hooks 24 depending from the lower end of flexible connections, as cables 25. Said cables pass over sheaves 26 and 27 mounted in the cage framework and lead around a drum 23 which is geared with the motor 16 by suitable mechanism, not necessarily described herein, whereby the drum 28 may be actuated as desired to lower or raise the bait and its connected head and guiding rod.

Surrounding the bait and its rod 11, and extending downwardly to a level adjacent the top of the pot, and depending from the cage is a protecting framework or shield 29. Said framework is preferably rectangular as indicated in Fig. 4, and one of its sides is mounted on hinges 30 as indicated, so that the frame may be thrown open for removal of the cylinder. Each of the sides, as to its outer area is provided with a series of adjustable slats 31 hinged or pivoted at opposite terminal corner portions and free to move as to the other side portion, by means of a connected operating rod 32, in the same general manner as the well-known slat-shutters used with windows. By this means the air circulation may be regulated at either side, and the cylinder-in-process protected by such regulation and the inclosing shield.

The entire protecting shield, as thus constructed, is fixedly connected with the framework of buggy 13 and moves with it along from one drawing position to another, the hinged door being used for giving access to the interior, facilitating manipulation and adjustment of the bait, or for any other desired purpose.

In Fig. 1 is shown a protecting cover 33 for the pot, mounted by means of a swinging davit 34 at one side of the pot and beyond the line of travel of the depending framework, for clearance. Cover 33, which may be of any suitable construction, is preferably lined with suitable refractory material and is provided with a series of fuel supply pipes 35, flexibly connected with any source of supply, as a gas main, by means of hose sections 36.

The construction of the apparatus will be readily understood from the foregoing description.

In operation, the buggy 13 moves along tracks 15, bringing rod 11 into central alinement with pot 2. Bait 8 being secured upwardly against base 9 and supported by connections 25, is then lowered into the molten glass in the pot, effecting engagement therewith and formation of the cylinder-in-process by gradual raising of the bait, as is customary in this art. The upward movement of the bait carries with it the central rod 11 until the full length of the movement has been traversed, locking key 20 thereupon coming into holding engagement with socket 19.

Prior to lifting the bait and rod to the full limit of its travel, however, the cylinder is severed at its base from the glass in formation, as indicated at the lower portion of Fig. 2, further upward movement bringing rod 11 and base 9 into the position indicated in said figure. Thereupon bait 8 and the formed cylinder may be lowered sufficiently far to bring the bait clear of base 9, as indicated, whereupon the cylinder and bait may be removed laterally through the open hinged side of the protecting shield, by any suitable mechanism. Thereupon, upon supplying another bait, the apparatus is ready for another operation at the next location.

The advantages of the invention will be readily understood and appreciated by all those familiar with the manufacture of machine drawn window glass.

It provides easy, convenient and reliable means for maintaining the operative parts in vertical alinement, for protecting the cylinder during its manufacture from the injurious effects of changes in temperature, and places the manipulating mechanism within the control of a single operator, with the accompanying advantages above set forth.

It will be understood that the invention may be changed or modified in various features of detailed construction or otherwise, by the skilled mechanic, to adapt it to different local conditions or otherwise, but all such changes are to be considered as within the scope of the following claims.

What I claim is:

1. In combination, a movable carriage provided with a vertically adjustable guide rod having a bait engaging head, a bait engaging said head, flexible means depending from the carriage for detachably engaging the bait, means mounted on the carriage for raising and lowering said means, and means for engaging and holding said guide rod in its raised position, said bait being adapted to be disengaged from said head, and adapted to be raised or lowered independent of said rod or head while so disengaged.

2. In combination with a vertically adjustable guide member having a flanged bait engaging head and means for temporarily arresting said guide member and said head, a bait adapted to telescopically engage said head, and raising and lowering mechanism having hooks detachably engaging the bait, said mechanism being adapted to normally move said guide member, said head and said bait and adapted to move said bait alone when said head is arrested.

3. In combination with a vertically adjustable rigid guide rod having a flanged bait engaging head and means for temporarily locking said parts in their raised position, a bait adapted to slidably telescope said head and abut said flange, means for normally raising and lowering all of said parts, said means having hooks detachably engaging said bait, and said bait and said means being adapted to operate separately from said guide rod and head to lower or raise said bait.

4. In combination, a movable carriage provided with a vertically adjustable guide rod adapted to detachably engage a bait, a source of power mounted in said carriage, means for raising and lowering said rod and said bait, said means being operatively connected with said source of power, and a protecting shield fixedly secured to and depending from said carriage and surrounding said guide rod and bait, each of the sides of said shield being provided with a series of adjustable slats, each of said series being adapted to be simultaneously moved by means of a connecting operating rod.

5. In combination, a movable carriage provided with an adjustable guide rod adapted to detachably engage a bait, a source of power mounted on said carriage, means for adjusting said rod and said bait, said means being operatively connected with said source of power, and a rectangular protecting shield fixedly secured to and depending from said carriage and surrounding said guide rod and said bait, each of the sides of said shield being provided with a series of adjustable slats pivoted at opposite terminal corner portions, all of said slats in each series being simultaneously movable by means of a connecting operating rod, and one of said sides of said shield being hingedly mounted to provide for the removal of the formed article.

In testimony whereof I hereunto affix my signature.

CLYDE S. ROBB.